No. 666,961. Patented Jan. 29, 1901.
D. D. FUNK.
COUNTERBALANCING DEVICE FOR AGRICULTURAL IMPLEMENTS.
(Application filed Nov. 16, 1900.)
(No Model.) 2 Sheets—Sheet 1.
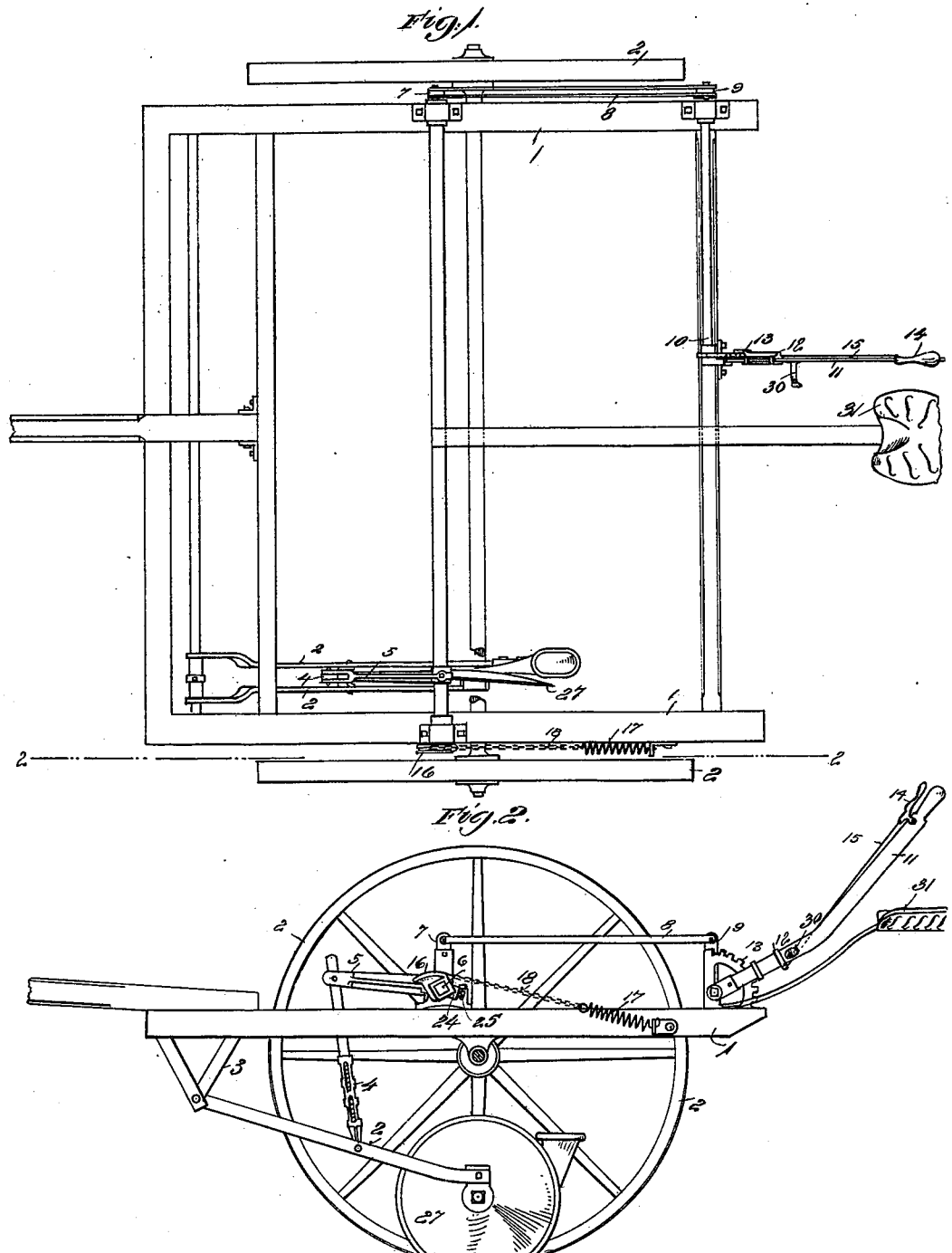

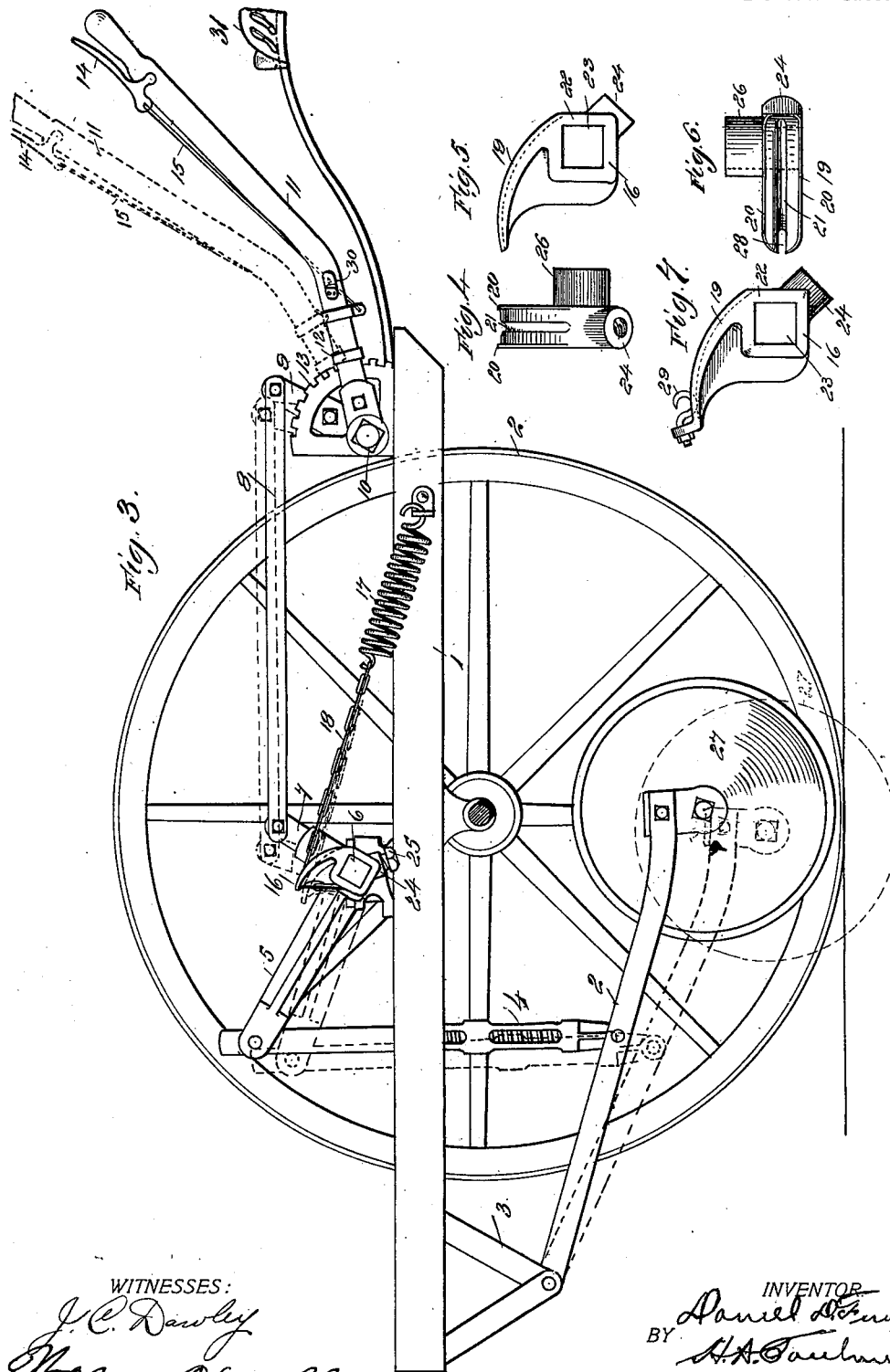

UNITED STATES PATENT OFFICE.

DANIEL D. FUNK, OF SPRINGFIELD, OHIO.

COUNTERBALANCING DEVICE FOR AGRICULTURAL IMPLEMENTS.

SPECIFICATION forming part of Letters Patent No. 666,961, dated January 29, 1901.

Application filed November 16, 1900. Serial No. 36,710. (No model.)

*To all whom it may concern:*

Be it known that I, DANIEL D. FUNK, a citizen of the United States, residing at Springfield, in the county of Clark and State of Ohio, have invented certain new and useful Improvements in Counterbalancing Devices for Agricultural Implements, of which the following is a specification, reference being had therein to the accompanying drawings.

This invention relates to counterbalancing or compensating devices for agricultural implements, and has for its object to provide means whereby the controlling of the operative parts of such implements may be facilitated. In the specific form in which its application is illustrated in the present instance I have shown the same as applied to the raising and lowering mechanism of a grain-drill.

In the accompanying drawings, Figure 1 is a plan view of a drill embodying my invention in one form. Fig. 2 is a section taken on the line 2 2 of Fig. 1. Fig. 3 is an enlarged view similar to Fig. 2 and illustrating the operation of the device. Figs. 4, 5, and 6 are detail views of a part of the mechanism, and Fig. 7 is a detail view of a modification.

In the said drawings I have illustrated the application of my counterbalancing device to a well-known form of grain-drills, in which 1 indicates the main frame, and 2 the carrying-wheels. The particular type of drill shown for purposes of illustration is what is known as a "front-lift" drill, in which the drag-bars are controlled by mechanism connected with the drag-bars in front of the furrow-opening devices; but the invention is also applicable, among other things, to "rear-lift" drills. In the construction shown the drag-bars 2 are pivoted at their forward ends to brackets 3 on the main frame and are connected by spring-bars 4 with arms 5 on a rock-shaft 6, mounted in bearings on the main frame. This rock-shaft is provided at one end with a crank-arm 7, which is connected by a link 8 with a crank-arm 9 on a counter-shaft 10, mounted in suitable bearings at the rear end of the main frame. This shaft is provided with the usual hand-lever 11, having a detent-pawl 12, coöperating with a notched segment 13 on the main frame and controlled by a detent-lever 14 and the usual connections 15.

The mechanism as far as thus described is, as already stated, selected for purposes of illustration only and may be of any approved construction.

On the shaft 6 or its equivalent is mounted an equalizing-arm 16, (illustrated in detail in Figs. 4, 5, and 6,) coöperating with a spring 17, connected therewith and with the main frame. The spring 17 is preferably a coiled spring connected at one end with the main frame, while its other end is connected with the arm 16 by a flexible connection 18, such as a chain. The arm 16 has a curved bearing-surface 19 for said chain, preferably provided with lateral retaining-flanges 20 and a central groove 21 to receive and hold the chain. The chain is secured to the free end of the arm, the curvature of which is eccentric to the shaft on which it is mounted, its maximum eccentricity being at its free end or extremity and its minimum eccentricity immediately adjacent to its body portion or hub 22. The preferred mode of connecting the chain and arm is that shown in Figs. 1 to 6, in which the arm is provided at its extremity with a notched or split lip, as shown at 28, in which one of the links of the chain will fit the next link, being at right angles and engaging the under side of the arm. Any other suitable connection may be employed, however—as, for instance, the hook-bolt 29 (shown in Fig. 7) or an integral hook. Those links of the chain which lie horizontal rest upon the bearing-surface of the arm between the flanges 20, while the alternate links, which lie vertically, are accommodated by the groove 21. As shown, said arm is provided with a rectangular opening 23 to fit upon the correspondingly-shaped shaft 6, a threaded collar 24 to receive a set-screw 25, by means of which it is secured on said shaft, and a collar 26, by means of which it is maintained in position on said shaft between the main frame and one of the carrying-wheels 2. These parts may, however, be varied as circumstances require.

It will be noted that in the position of the parts shown in Fig. 2, in which the furrow-opening devices, which are shown as disks 27, are illustrated as being in a working position or sufficiently depressed to enter the soil, while the spring 17 is at a maximum tension it exerts a minimum leverage on the equalizing-arm 16, and consequently does not offer any objectionable resistance to the force applied to cause the furrow-opening devices to enter the ground. It will also be noted that in raising or lowering the furrow-opening devices the leverage of the spring increases as its tension decreases and, conversely, decreases as the tension increases, so that the force of the spring exerted in aiding the action of the force applied to the hand-lever 11 is equalized throughout the range of movement of said lever. It will also be observed that the lever 11 is provided with a stirrup or foothold 30, by means of which the weight or power of the operator may be applied to the said lever by means of his foot to raise the furrow-opening devices when the operator is riding on the seat 31. This construction and its operation are rendered practicable by reason of the use of the counterbalancing device, since the power applicable in this way would otherwise be insufficient to raise the furrow-opening devices.

While I have described one specific application of my invention, it is obvious that it is adapted for use in other connections, and I therefore do not wish to be understood as limiting myself to the precise embodiment hereinbefore described, and shown in the accompanying drawings. For instance, other mechanism than that shown may be employed for raising and lowering the furrow-opening devices.

Having thus fully described my invention, what I claim as new, and desire to secure by Letters Patent, is—

1. The hereinbefore-described equalizing device, comprising a rock-shaft, a frame or support, means for operating said shaft, an equalizing-arm mounted on said shaft and having a bearing-surface with a curvature eccentric to the shaft, and a spring connected with the frame or support and having a flexible connection with said equalizing-arm and adapted to act on said bearing-surface as said arm is moved, substantially as described.

2. The hereinbefore-described equalizing device, comprising a rock-shaft, a frame or support, means for operating said shaft, an equalizing-arm mounted on said shaft and having a bearing-surface with a curvature eccentric to the shaft and provided with lateral flanges and a central groove, a spring connected with the frame or support, and a chain connected at one end to the spring and at the other end to the extremity of the arm and adapted to bear upon the curved surface of the arm, substantially as described.

3. The herein-described equalizing device, comprising a rock-shaft, a frame or support, means for operating said shaft, an equalizing-arm mounted on said shaft and having a bearing-surface with a curvature eccentric to said shaft, and a spring connected with the frame or support and with said equalizing-arm and adapted to act on said bearing-surface as the arm is moved, the minimum eccentricity of said arm being adjacent to the spring and furnishing the leverage when the spring is at its maximum tension, and the maximum eccentricity of said arm serving as a point of attachment of the spring connection and furnishing the leverage when the spring is at its minimum tension, substantially as described.

4. In a grain-drill or the like, the combination, with the frame and drag-bars pivoted thereto and carrying furrow-opening devices, of means for raising and lowering said drag-bars comprising a rock-shaft connected with said bars, an operating-lever connected with said rock-shaft, an equalizing-arm on said rock-shaft having a bearing-surface with a curvature eccentric to said shaft, and a spring connected with the frame and having a flexible connection with said equalizing-arm and adapted to act on its bearing-surface as said arm is moved, substantially as described.

5. In a grain-drill, the combination, with the frame and drag-bars pivoted thereto and carrying furrow-opening devices, of means for raising and lowering said drag-bars comprising a rock-shaft connected with said bars, a hand-lever connected with said rock-shaft and provided with a stirrup or foothold, an equalizing-arm on said rock-shaft having a bearing-surface with a curvature eccentric to said shaft, and a spring connected with the frame and having a flexible connection with said equalizing-arm and adapted to act on its bearing-surface as said arm is moved, substantially as described.

6. In a grain-drill or the like, the combination, with the frame, and drag-bars pivoted thereto and carrying furrow-opening devices, of means for raising and lowering said drag-bars, comprising a rock-shaft having spring connections with said drag-bars, a hand-lever operatively connected with said rock-shaft, an eccentric equalizing-arm on said rock-shaft, and a spring connected to the frame and to the equalizing-arm, substantially as described.

In testimony whereof I affix my signature in presence of two witnesses.

DANIEL D. FUNK.

Witnesses:
   E. O. HAGAN,
   IRVINE MILLER.